Oct. 11, 1966 KOICHI NAKAMURA 3,278,242
SAFETY AIR BRAKE SYSTEM FOR AUTOMOTIVE VEHICLES
Original Filed Nov. 12, 1963 6 Sheets-Sheet 1

INVENTOR.
KOICHI NAKAMURA
BY
Western & Western

INVENTOR.
KOICHI NAKAMURA
BY
Western & Western

Oct. 11, 1966  KOICHI NAKAMURA  3,278,242
SAFETY AIR BRAKE SYSTEM FOR AUTOMOTIVE VEHICLES
Original Filed Nov. 12, 1963  6 Sheets-Sheet 4

INVENTOR.
KOICHI NAKAMURA
BY
Western & Western

United States Patent Office 3,278,242
Patented Oct. 11, 1966

3,278,242
SAFETY AIR BRAKE SYSTEM FOR
AUTOMOTIVE VEHICLES
Koichi Nakamura, 60 Shinyashiki, Kochi-shi, Japan
Original application Nov. 12, 1963, Ser. No. 322,877, now Patent No. 3,220,780. Divided and this application Aug. 24, 1965, Ser. No. 491,072
Claims priority, application Japan, Nov. 16, 1962, 37/49,774; Aug. 21, 1963, 38/61,867
3 Claims. (Cl. 303—13)

This application is a divisional of Patent No. 3,220,780.

This invention relates to a safety air brake system for automotive vehicles.

The pressure systems of conventional air brake systems for automotive vehicles are not divided into front and rear systems. Therefore, if an air leakage occurs at any point in such a pressure system, all parts of the braking system will become completely inoperative, leading to an extremely dangerous condition.

An object of this invention is to provide a safety air brake system for automotive vehicles, wherein the pressure system is completely divided into front and rear sides, so that even if air leakage should occur in one side of the system, the other side would operate without fail to effect braking action.

Other objects, features, and advantages of the present invention will be apparent from the following detailed description of illustrative embodiments of the same taken in connection with the accompanying drawings, in which, FIG. 1 is a schematic diagram of a conventional air brake system;

Figure 1:
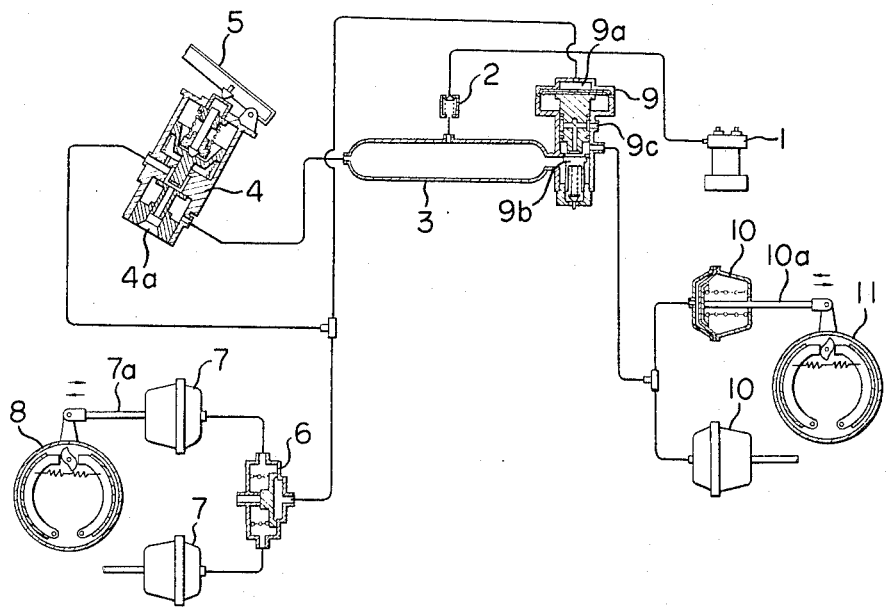

Referring now to FIG. 1, there is shown an air brake system of conventional construction including an air reservoir tank 3, in which is accumulated compressed air supplied from an air compressor 1 through a check valve 2, said air compressor 1 being driven by an engine (not shown). In such a system, when a brake pedal 5 is depressed, a brake valve 4 is actuated to supply the compressed air through a quick-response relay valve 6 into a front brake chamber 7, causing a connecting rod 7a to be pushed to brake a front wheel 8. At the same time, the compressed air is supplied to an upper chamber 9a of a relay valve 9 causing a valve 9b to open, so that the compressed air in the air reservoir tank 3 is supplied through the valve 9 into a rear brake chamber 10, thus causing a connecting rod 10a thereof to be pushed to brake a rear wheel 11.

When the brake pedal 5 is released, the compressed air in the front system is vented into the atmosphere through the quick-response relay valve 6 and an outlet port 4a of the brake valve 4, and, at the same time, since the air pressed air in the rear system is vented from the outlet valve 9 disappears, the valve 9b is closed, and the compressed air in the rear system is vented from the outlet port 9c of the relay valve 9 into the atmosphere. Thus, this type of system, as described above, has the disadvantage of being incapable of braking in the case of air leakage, during braking action, in either of the front and rear systems because of pressure reduction in the air reservoir tank 3.

Figure 2:
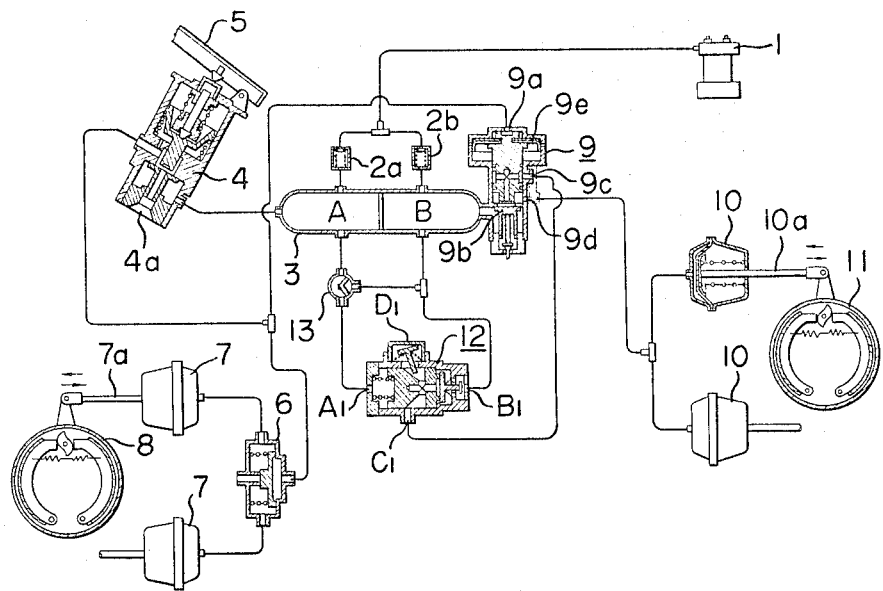
FIG. 2 is a schematic diagram of one form of the air brake system according to this invention.
Figure 3:
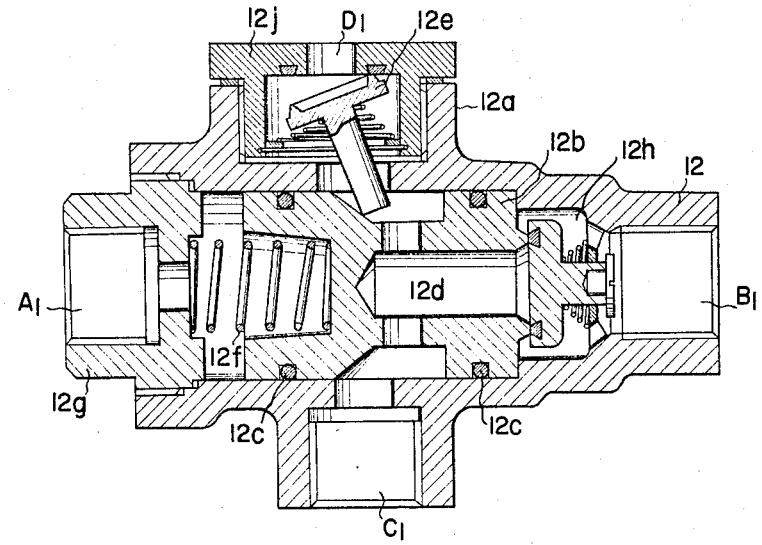
FIG. 3 is a longitudinal sectional view on a larger scale of the safety device shown in FIG. 2.

Referring now to FIGS. 2 and 3, in which is shown embodiment of this invention, the same numerals as those in FIG. 1 designate the same or equivalent parts of the system. This system includes an air reservoir tank 3 consisting of two independent chambers A and B, supplied with the compressed air through check valves 2a and 2b, respectively. The chamber A is constructed so as to communicate with the front wheel 8, and the chamber B with the rear wheel 11. To the chamber B is secured a relay valve 9, and between the chambers A and B and the relay valve 9 is connected a unique safety device 12 according to this invention.

The constructional details of this safety device 12 are shown in FIG. 3. The safety device 12 includes a cylinder 12a having a bore extending in the longitudinal direction of the device. At the two ends of the device 12 there are provided ports $A_1$ and $B_1$, and at the bottom of the device there is a port $C_1$ communicating with the cylinder bore. The port $A_1$ is connected via a three-way valve 13 to the chamber A of the tank 3, the port $B_1$ is connected to the chamber B, and the port $C_1$ is connected to the outlet port 9c of the relay valve 9. On the side wall of the cylinder 12a there is provided an outlet port $D_1$ in communication with the cylinder bore. A piston 12b is slidably inserted in the cylinder bore, which piston 12b has packings 12c there around and an annular groove having an inclined or beveled wall 12d. The inclined wall 12d is in contact with the lower end of an emergency valve 12e for opening or closing the port $D_1$ and always urges the lower end of the valve 12e toward the right as viewed in FIG. 3. The piston 12b has a passage extending transversely therein so as to communicate with the ports $C_1$ and $D_1$ and a passage extending longitudinally therein so as to communicate with the first mentioned passage and terminate in the right end of the piston.

When the piston 12b is moved toward the port $A_1$, the emergency valve 12e closes the port $D_1$. Between a cylinder cover 12g having the port $A_1$ and the piston 12b there is arranged a coil spring 12f which urges the piston 12b toward the port $B_1$ of the cylinder 12a and brings an annular end projection of the piston 12b in contact with a check valve 12h. This check valve 12h is normally in contact with the end projection of the piston 12b, but is separated from the end projection when the piston is moved toward the port $A_1$ a predetermined distance, because the valve 12h is urged leftwardly by a coil spring arranged therearound, and the longitudinal displacement thereof toward the port $A_1$ is limited by an end flange provided on its right hand end which comes into contact with the valve support to stop the valve when the valve reaches the limited position. On the side of the cylinder 12a there is secured a cover 12j provided with a seat for receiving the emergency valve 12e. The cover 12j is also provided with said port $D_1$ therein.

The operation of the safety device 12 is as follows. When the piston 12b is moved rightwardly into contact with the check valve 12h, the port $C_1$ and the port $D_1$ come into communication through the transverse passage in the piston 12b, and when the piston 12b is moved leftwardly, the emergency valve 12e is closed by the spring thereof to break the communication between the ports $C_1$ and $D_1$, while the communication between the ports $B_1$ and $C_1$ is established via the longitudinal passage in the piston and the space between the check valve 12h and the right-hand end of the piston 12b.

Figure 5:
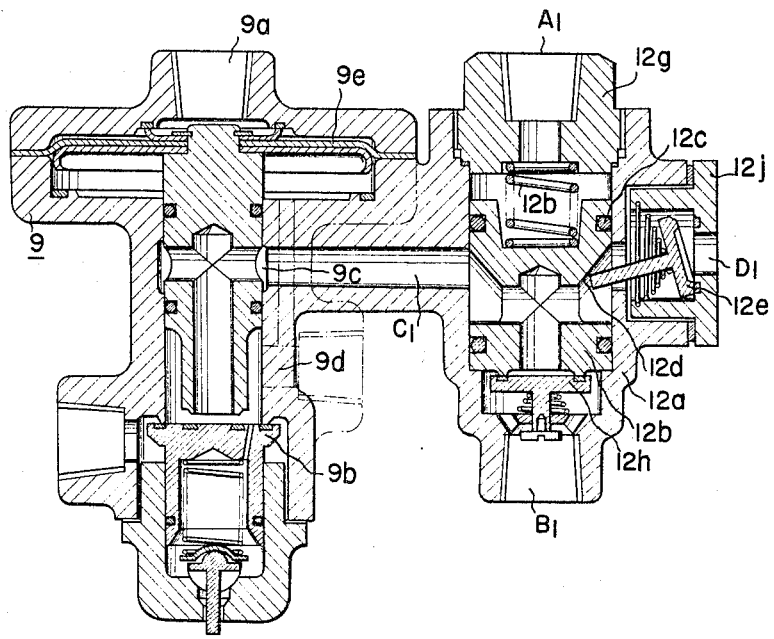
FIG. 5 is a sectional view on a larger scale of the combined safety device and relay valve shown in FIG. 4.

The upper portion of the relay valve 9 is constructed, for example, as shown in FIG. 5 in consideration of possible damage to rubber diaphragms 9e which maintain the air tightness between the front and rear systems.

When the brake pedal 5 is depressed in normal operation, the front and rear systems effect braking action as in the case shown in FIG. 1. In this case, the pressures acting on the sides $A_1$ and $B_1$ of the safety device 12 are in equilibrium, so that the piston 12b is not operated. When the brake pedal 5 is released, the compressed air in the front system is vented through the quick-response relay valve 6 and the outlet port 4a of the brake valve 4 into the atmosphere, while the compressed air on the rear side, instead of being vented directly from the relay valve 9 into the atmosphere, is directed through the port 9c to the port $C_1$ of the safety device 12 and then vented into the atmosphere through the interior of the device 12 and through the port $D_1$.

In the event of an air leakage in the front system during braking action, the front system becomes incapable of effecting braking action. However, the rear side system is capable of effecting braking action, because the reduction of pressure acting on the side of the port $A_1$ of the safety device 12 causes the piston 12b to be displaced toward the port $A_1$, thereby causing the emergency valve 12e to close the port $D_1$ and also the check valve 12h to be separated from the end projection of the piston 12b, and because the compressed air in the chamber B of the tank 3 is supplied through the port $B_1$, the port $C_1$, the port 9c, and the port 9d into the rear brake chamber 10 to effect braking action in the rear system. In such a state, the release of the brake pedal 5 will not release the braking action in the rear system, and it is necessary to operate the three-way valve 13 in order to disrupt the braked state of the rear system. By turning the valve 13 into a position in which the chamber A of the tank 3 is disconnected from the port $A_1$ of the device 12, and the other chamber B of the tank 3 is connected with the port $A_1$, the pressures on the sides of the ports $A_1$ and $B_1$ can be equalized, whereby the piston 12b returns to its original position (see FIG. 3), thus causing the emergency valve 12e to open and at the same time causing the end projection thereof to come into contact with the check valve 12h with the result that the compressed air remaining in the rear system is vented from the outlet port $D_1$ of the safety device 12 through the relay valve 9 and through the interior of the device 12. Thus, the braking action in the rear system is stopped.

Thereafter, the braking operation, if desired, can be carried out by operating the three-way valve 13 as long as pressure exists in the air chamber B of the tank 3, and it will be possible for the vehicle driver to freely operate the three-way valve 13 to effect braking action if the cock is arranged near the driver's seat.

In the event of air leakage in the rear system during the braking operation, the pressure in the chamber B will be reduced, but, since the pressure in the front system is maintained by means of the rubber diaphragms 9e in the upper portion of the relay valve 9, the front system will be capable of effecting the braking action because of the pressure in the chamber A. In this case, the safety device 12 will not operate at all, and upon the release of the brake pedal 5, the front brake system completely stops its braking action.

Figure 4:
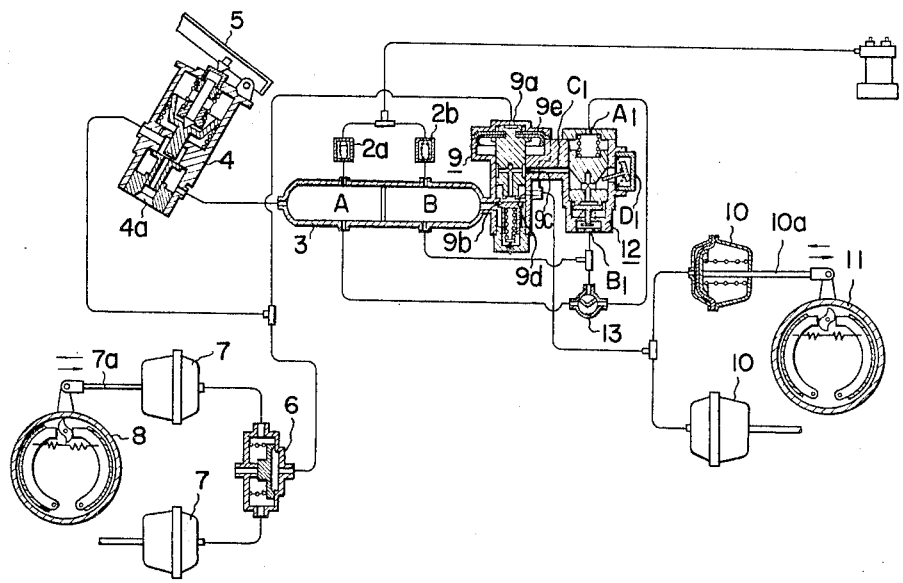
FIG. 4 is a schematic diagram of another form of the air brake system according to this invention, in which the safety device and a relay valve are formed as an integral body.

The embodiment of the invention shown in FIG. 4 is of the same construction as that in FIG. 2, except that the safety device 12 and the relay valve 9 are constructed as one integral body, and the port 9c of the relay valve 9 and the port $C_1$ of the safety device 12 are directly connected to each other. The principle of operation of both embodiments is completely the same. FIG. 5 shows a detailed section of the assembly of the safety device 12 and the relay valve 9 shown in FIG. 4.

Figure 6:
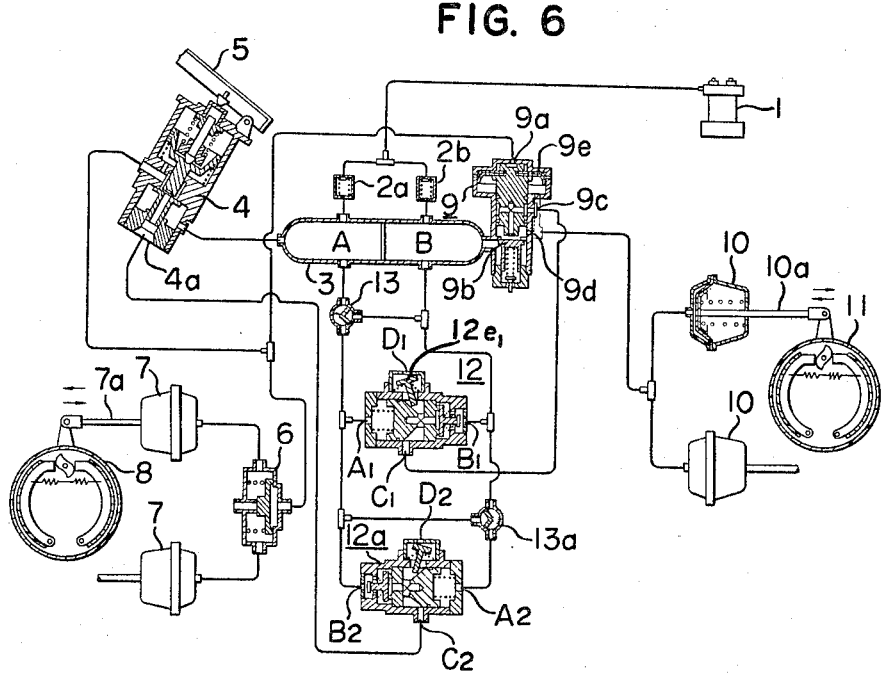
FIG. 6 is a schematic diagram of still another form of the air brake system according to this invention, in which two safety devices are employed.

Referring now to FIG. 6, there is shown an embodiment of the invention incorporating a combination of two safety devices 12 and 12a and two three-way valves 13 and 13a. When both pressure systems A and B are in normal condition, the pistons of both safety devices 12 and 12a do not move and remain in the position shown since the pressures on the sides $A_1$ and $B_1$ of the safety device 12 and on the sides $A_2$ and $B_2$ of the safety device 12a are in equilibrium.

It will now be supposed that air leakage has occurred on the front side (side A) of the system during braking operation. Then, the side of the port $A_1$ of the safety device 12 and the side of the port $B_2$ of the safety device 12a will be reduced in pressure whereby the piston of the safety device 12 will be displaced toward the port $A_1$ causing the emergency valve 12e to close the outlet port $D_1$ of the device 12, while the compressed air in the chamber B of the tank 3 will be supplied via the port $B_1$ of the safety device, the port $C_1$ of the same, the port 9c of the relay valve 9, and then the port 9d of the same into the rear brake chamber 10 to effect braking action. When the brake pedal 5 is released, the compressed air in the rear system can be vented from the outlet port $D_1$ of the safety device 12 through the relay valve 9 by turning the three-way valve 13 so as to make communication between the chamber B and the port $A_1$ of the safety device 12 to allow the piston thereof to move to its original position rightwardly as shown in FIG. 6.

It will now be supposed that air leakage has occurred on the rear side (side B) of the system. Then, the side of the port $B_1$ of the safety device 12 and the side of the port $A_2$ of the safety device 12a will be reduced in pressure, whereupon the piston of the safety device 12a will move toward the port $A_2$ causing the outlet port $D_2$ of the device 12a to be closed by the emergency valve $12e_1$, while the compressed air in the chamber A of the tank 3 is supplied via the ports $B_2$ and $C_2$ of the safety device 12a to the outlet port 4a of the brake valve 4. However, the compressed air thus supplied cannot effect braking action on the front side of the system because this compressed air cannot advance through the valve 4 since the brake pedal 5 is depressed. In this case, the braking operation is carried out by the compressed air which is supplied from the air chamber A through the brake valve 4 into the front brake chamber 7. If air leakage occurs on the rear side (side B) of the system with the brake pedal 5 in released condition, the braking operation will be effected by the compressed air supplied from the chamber A through the ports $B_2$ and $C_2$ of the safety device 12a and the port 4a of the brake valve 4 into the front brake chamber 7. In this case, the line leading from the chamber A directly to the brake valve 4 is not unrelated to the braking operation. When the brake pedal 5 is released from the depressed condition, the compressed air accumulated in the front side (side A) by braking operation can be vented from the outlet port $D_2$ of the safety device 12a by turning the three-way valve 13a so as to allow the communication via the brake valve 4 and the safety device 12a between the chamber A and the port $A_2$ of the safety device 12a to cause the piston to move leftwardly as shown in the drawing.

Figure 7:
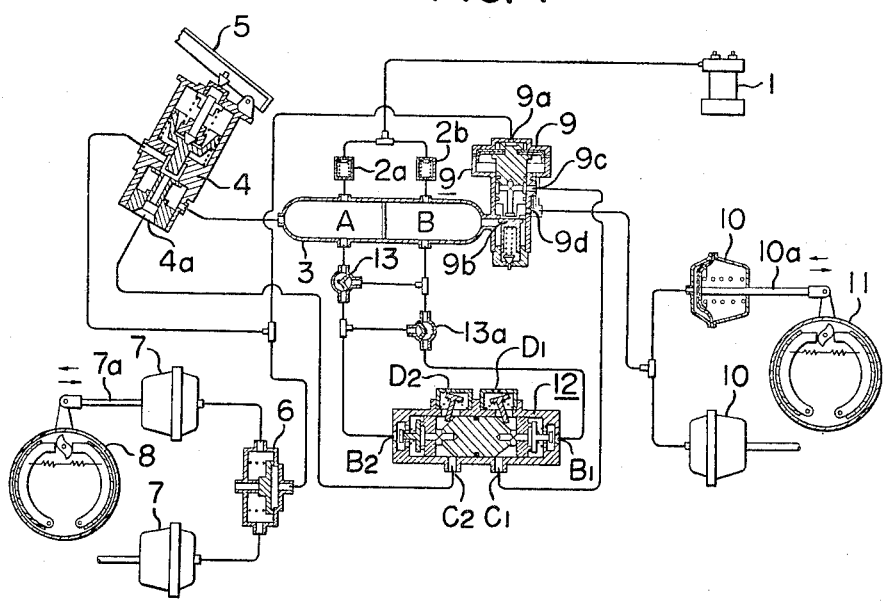
FIG. 7 is a schematic diagram of a further form of the air brake system according to this invention, in which two safety devices are formed integrally as one body.

An embodiment of the invention shown in FIG. 7 corresponds to the case in which two safety devices 12 and 12a shown in FIG. 6 are formed to have one integral body. That is, the port $A_1$ of the first safety device 12 and the port $A_2$ of the second safety device 12a are directly connected to each other and the pistons provided in both safety devices are formed as one integral body.

In the operation of this type of system, when the pressure systems A and B are in normal condition, the pressures acting on the side of the port $B_1$ and the side of the port $B_2$ of the safety device are in equilibrium, whereby the piston will not be displaced and will be held in the condition as shown. When air leakage occurs on the side of the chamber A during braking operation, the pressure will be reduced on the side of the port $B_2$ of the safety device 12, whereby the piston moves toward the port $B_2$ causing the emergency valve 12e, to close the outlet port $D_1$ of the device 12, while the end projection of the piston separates from the check valve 12h. This causes the compressed air in the chamber B to be supplied via the ports $B_1$ and $C_1$ of the safety device 12 and the ports 9c and 9d of the relay valve 9 into the rear brake chamber 10 to effect braking action on the rear side of the system. When the brake pedal 5 is released, the compressed air accumulated in the rear system by the braking operation may be vented from the outlet port $D_1$ of the safety device 12 by turning the three-way valve 13 so as to make the communication between the chamber B and the port $B_2$ of the device 12 via the relay valve 9 and the port $C_1$ of the device 12 to cause the piston to return rightwardly. When air leakage occurs on the rear side (side B) of the system, the operation will be exactly the same except for symmetrically opposite functioning of the parts. (Reference is made to the description in connection with FIG. 6.)

Figure 8:
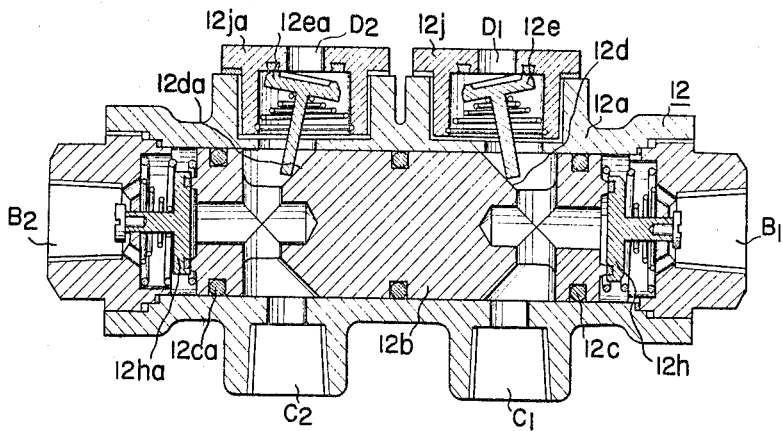
FIG. 8 is a sectional view on a larger scale of the safety device shown in FIG. 7.

In FIG. 8, there is shown a detailed section of the safety device 12 which is employed in the embodiment of FIG. 7. The function thereof will be apparent from the foregoing description taken in connection with FIG. 1 to FIG. 7.

Figure 9:
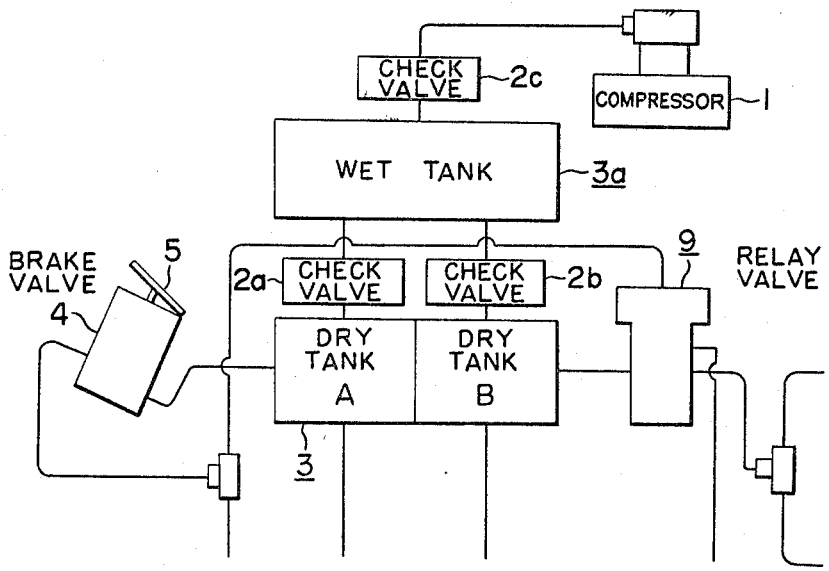
FIG. 9 is a schematic diagram of yet another form of the air brake system according to this invention, having a wet air reservoir tank and a dry air reservoir tank.

When dry and wet air reservoir tanks are used, only the dry tank 3 may be divided into two chambers A and B as shown in FIG. 9, and the dry and wet tanks 3 and 3a may be arranged as shown in FIG. 9. The operation of this system will be easily understood from the foregoing description.

Figure 10:
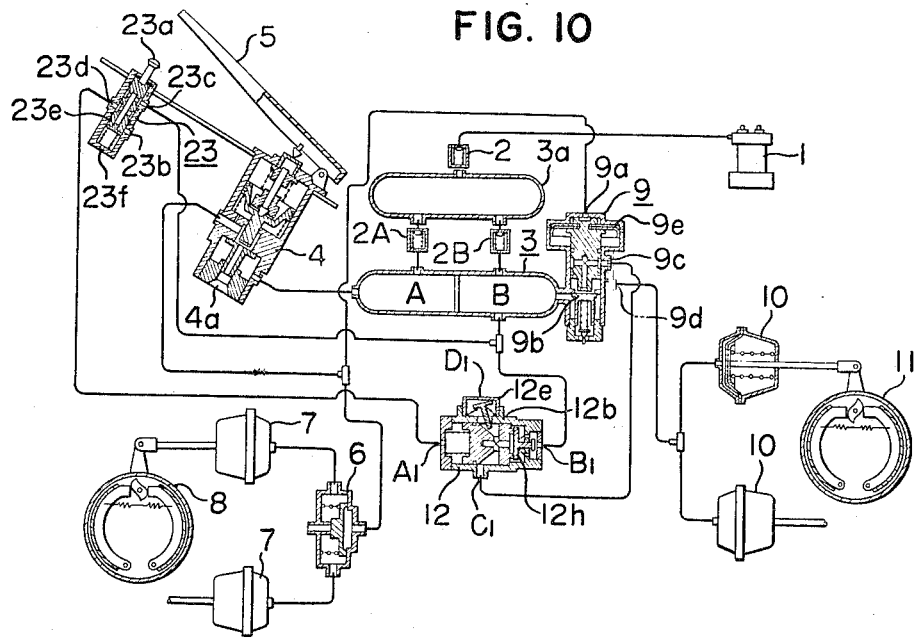
FIG. 10 is a schematic diagram of still another form of the air brake system according to this invention.

Referring now to FIG. 10, another form of this invention including a wet air reservoir tank 3a communicating through a check valve 2 with an air compressor 1 will now be described. Compressed air is supplied from an air compressor 1, through a check valve 2 to a tank 3a, and then through check valves 2A and 2B to chambers A and B, respectively, of a dry air reservoir tank 3. The chambers A and B are constructed so as to communicate with the front and rear wheels 8 and 11, respectively. The chamber B has a relay valve 9 secured thereto, and a safety device 12 is connected between the chamber B and the relay valve 9. This arrangement of the ports so far named is the same as that shown in FIG. 2. There are also provided, as in the case of the afore-described embodiments, a brake valve 4 cooperating with a brake pedal 5, a quick-response relay valve 6 communicating with a front brake chamber 7, a rear brake chamber 10, and the front and rear wheels 8 and 11.

Figure 11:
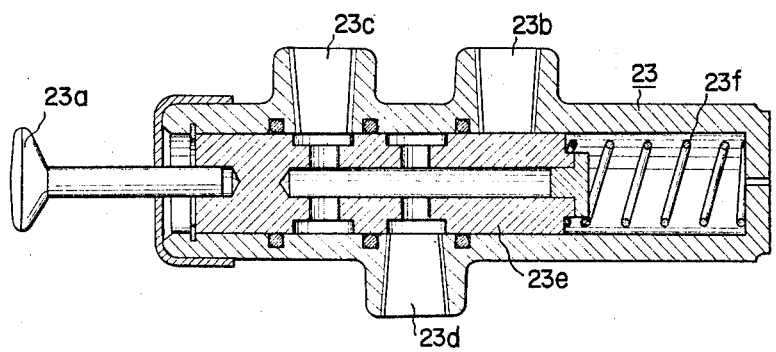
FIG. 11 is a sectional view on a larger scale of the change-over valve employed in the system shown in FIG. 10.

Between the chamber B of the tank 3 and the safety device 12 there is connected a change-over valve 23, the details of which are shown in FIG. 11. This change-over valve 23 comprises a top end projection 23a adapted to be pressed down by the brake pedal 5 only when the pedal 5 is deeply depressed, a port 23b opening into the atmosphere, a port 23c communicating with the chamber B of the air reservoir tank 3, a port 23d communicating with the port $A_1$ of the safety device 12, a piston 23e slidably inserted in the valve body and adapted to be moved with said top end projection 23a, and a spring 23f urging the piston 23e toward the brake pedal 5. The piston 23e has a longitudinal passage and two transverse passages communicating with the longitudinal passage. These passages function to make the communication between the ports 23c and 23d or between the ports 23b and 23d, when the piston moves.

When the brake pedal 5 is depressed under normal condition, the brake valve 4 is actuated to transmit the pressure in the chamber A of the tank 3 to the front system and to transmit the pressure in the chamber B to the rear system through the intermediary operation of the relay valve 9. In such a state, the pressure from the chamber B is acting on the side of the port $A_1$ of the safety device 12 through the opened change-over valve 23 and is acting directly on the side of the port $B_1$ of the safety device 12, whereby pressure equilibrium is established, and the piston 12b does not move. Thus, the safety device 12 is inoperative.

When the brake pedal 5 is released, the pressurized air in the front system is vented from the outlet port 4a of the brake valve 4 after passing through the quick-response relay valve 6, while the pressurized air in the rear system, without being vented from the relay valve 9 into the atmosphere, is vented from the port $D_1$ of the safety device 12 after passing through the port 9c of the valve 9 and the port $C_1$ of the device 12.

When the brake pedal is depressed deeply so as to push the top end 23a of the change-over valve 23, the pressurized air acting on the side of the port $A_1$ is vented from the port 23b of the change-over valve 23 into the atmosphere, whereby the piston 12b of the safety device 12 moves leftwardly. Thus, the compressed air in the chamber B of the tank 3 is in communication with the rear system through the safety device. However, the braking force on the rear system is not changed because of the compressed air in the chamber B being also in communication with the rear system through the relay valve 9. Thus, the operation of the safety device 12 does not produce any influence on the braking action in such a case. Normally, the top end 23a of the change-over valve 23 will not be pushed down by the brake pedal 5, since the brake pedal is not deeply depressed except in the case of an emergency.

In the event of air leakage on the rear side (side B) of the system, the pressure in the chamber B will be reduced, while the pressure in the front side system will be maintained by means of the rubber diaphragms 9e in the upper portion of the relay valve 9, thus effecting the braking action in the front system. In this case, the operation of the safety device 12 caused by depression of the top end 23a of the change-over valve 23 by the deep depressing of brake pedal 5 does not cause the braking action on the rear side since the air leakage exists in the rear system.

In the event of air leakage on the front side (side A) of the system, the deep depressing of the brake pedal 5 causes the depressing of the top end 23a of the valve 23, so that the compressed air from the chamber B is shut off at the valve 23 with the result that the side of port $A_1$ of the safety device 12 is subjected to atmospheric pressure. The piston 12b of the device 12 is, therefor, moved leftwardly to pass the compressed air in the chamber B through the ports $B_1$ and $C_1$ of the safety device 12, and then through the ports 9b and 9c of the valve 9, into the rear brake chamber 10 for rear braking operation. When the brake pedal 5 is released, the change-over device 23 returns to the position shown in FIGS. 10 and 11, and the pressures on both sides (sides $A_1$ and $B_1$) will be the same as that in the chamber B, whereby the piston 12b returns to the position as shown in FIG. 10, thus making the brake system inoperative.

Figure 12:
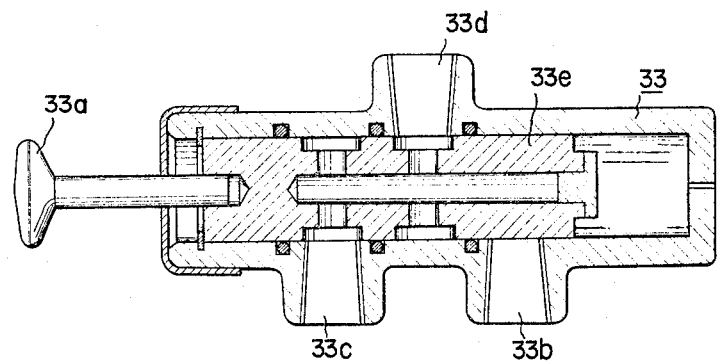
FIG. 12 is a sectional view on a larger scale of a modified change-over valve.

In FIG. 12, there is shown a modification of the change-over valve. In this valve 33, the spring 23f is removed, and, therefore, the piston 33e thereof will not return automatically to its original position. In this case, the change-over valve may be arranged near the driver's seat to be manually-operated, in the event of a front side air leakage, for the operation of the safety device 12. Although the air reservoir tank 3 shown in the drawings is divided into two chambers, it may be formed from two independent tanks each having one chamber.

According to the embodiment shown in FIGS. 10 to 12, even if air leakage should occur in the front system, the brake system would be capable of effecting braking operation on the rear side by the operation of the safety device 12 caused by depression of the change-over valve 23 by the brake pedal 5 or manual operation of the change-over valve 33 positioned near the driver's seat. Thus, the braking operations can be effected at will by the driver and anticipation of braking actions can be obtained, which lessen the degree of danger. Furthermore, in the case of front side air leakage, the braking system can be actuated on the rear side by the operation of the safety device caused by actuating the change-over valve 23 or 33, independently of the pressure differential between the two chambers A and B as long as pressure remains in the chamber B. In addition, the operation of this system is reliable because pressure balances on both sides of the piston of the safety device are obtained only by the pressure in the chamber B of the tank 3.

Having described my invention, it is to be understood that the forms of the invention shown and described are to be taken as preferred examples of the same, and that various changes and modifications may be made within the spirit of the invention or the scope of the appended claims.

What I claim is:

1. A safety air brake system for automotive vehicles comprising, in combination, an air reservoir having a first and a second chamber, independent of each other; check valves on each said chamber for the admittance of compressed air; front wheel braking means connected to said first chamber; rear wheel braking means connected to said second chamber; a relay valve disposed between said second chamber and said rear wheel brake means and operated by the actuation of said front wheel braking means; a brake valve; a brake pedal for operating said brake valve, said brake valve being disposed between said first chamber and said front wheel braking means; a safety device including a piston normally subjected to the air pressure of said second chamber on both sides; an air vent for said rear wheel braking means; a valve for opening and closing said air vent, responsive to the displacement of said piston; a check valve for passing the compressed air from said second chamber by way of said relay valve to said rear wheel braking means when said air vent is closed; and a change-over valve connected between one side of said piston and said second chamber, normally maintaining communication between one side of said piston and said second chamber and adapted to interrupt said communication to allow one side to communicate with the atmosphere when operated.

2. The air brake as defined in claim 1, wherein said change-over valve is operated by said brake pedal.

3. The air brake as defined in claim 1, wherein said change-over valve is operated manually.

References Cited by the Examiner

UNITED STATES PATENTS 2,874,002  2/1959  Cambeis _____ 302—2

EUGENE G. BOTZ, *Primary Examiner.*